June 25, 1957 J. M. EGLIN 2,797,314
DEMODULATION OF VESTIGIAL SIDEBAND SIGNALS
Filed March 5, 1953

INVENTOR
J. M. EGLIN
BY [signature]
ATTORNEY

United States Patent Office
2,797,314
Patented June 25, 1957

2,797,314

DEMODULATION OF VESTIGIAL SIDEBAND SIGNALS

James M. Eglin, Glen Rock, N. J., assignor to Bell Telephone Laboratories, Incorporated, New York, N. Y., a corporation of New York Application March 5, 1953, Serial No. 340,615

5 Claims. (Cl. 250—20)

Figure 1:
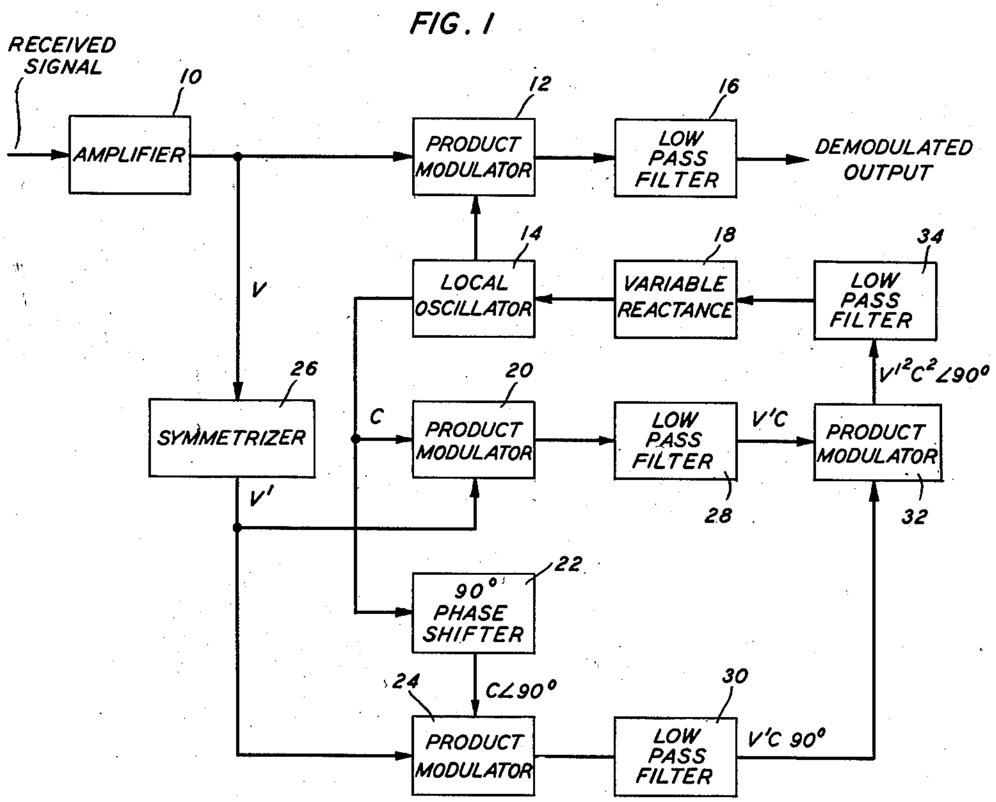

This invention relates to communication systems employing modulated carriers and more particularly to receivers for use in such systems.

In the reception of carrier modulated waves, the method of demodulation employed must be chosen with reference to the characteristics of the transmitted wave as determined by the nature of the modulation process. In systems employing amplitude modulation, transmission may be effected by the double sideband, single sideband or vestigial sideband methods. Each of these well-known methods may, under certain circumstances at least, impose definite restrictions upon the type of demodulation apparatus employed.

If, for example, in any of these methods the nature of the modulator is such that the carrier is always less than 100 percent modulated by the signal to be transmitted, the signal information can be recovered at the receiver by envelope detection. In the vestigial sideband method the signal can be recovered in this way without undesirably large amounts of distortion if the excess carrier ratio is sufficiently great.

If, however, the modulation process employed results in greater than 100 percent modulation of the carrier, envelope detection cannot be employed but the alternative method of product demodulation may be used. As is well known, this type of demodulation requires the supply at the receiver of a locally generated carrier wave which is accurately in phase with the carrier employed at the transmitter for the generation of the particular signal which it is desired to demodulate and carried through the system therefrom. Similarly there are many cases in which product demodulation affords the only practical way of recovering the message signal when vestigial sideband transmission is employed.

In any instance in which product demodulation is employed, the provision of an accurately phased locally generated carrier is essential and errors in the relative phase of the carrier result in undesired distortions of the demodulated signals. The present invention relates to a system for resupplying the carrier wave at the receiver and is disclosed in connection with a vestigial sideband system for the transmission of television and other picture signals although it is equally applicable to other systems of the types referred to above.

The vestigial sideband method of transmission has found considerable application in communication systems over which television and other picture signals are to be transmitted since this method permits transmission of direct current and very low frequency signal components and high utilization of the transmission band available for a particular facility. In such service, however, extremely high transmission requirements must be met to avoid noticeable distortion in the reproduced picture signals.

It is well known that by virtue of shaping in the production of vestigial sideband signals an output signal for transmission is obtained which comprises two components.

The first of these, which will be referred to hereinafter as the real or in-phase component, comprises a carrier cos $\omega t$ which is in phase with the steady state carrier after it has been carried through the system. This carrier is modulated by the applied signal information P. The second, which will be referred to as the quadrature component, comprises a carrier sin $\omega t$ which is in quadrature with the steady state carrier and is modulated by signal information Q related to the applied signal information P but with each component sinusoidal modulating wave shifted in phase with respect thereto by 90 degrees and altered in amplitude. The presence of the quadrature component $Q$ sin $\omega t$ in the transmitted wave results in undesirable distortion of the signal information recovered at the receiver unless special circuits are provided to alleviate this effect.

It has been found that such quadrature distortion can be reduced or substantially eliminated if the vestigial sideband signal is subjected to envelope detection and suitable measures such as increasing the amount of carrier signal or the width of the vestigial sideband are employed. However, as has been stated above, the use of envelope detection frequently requires that the transmitted signal have an undesirably large value of excess carrier. This requirement places severe restrictions on systems for the transmission of television signals.

It has also been demonstrated that a vestigial sideband signal having any degree of modulation whatever can be demodulated by product modulation to yield the original video frequency signals without quadrature distortion if the locally generated or "resupplied" carrier required for this type of demodulation is accurately in phase with the real component of the picture signal. The difference in phase between the locally supplied carrier and the real component of the transmitted signal determines the amount of distortion comprising quadrature component which will result in the demodulated signal. The arrangement of the invention is thus particularly advantageous when applied to vestigial sideband systems of this type.

In the copending application of J. W. Rieke, Serial No. 332,449, filed January 21, 1953, a local carrier supply system is disclosed for use at the receiver of a communication system of the type requiring carrier resupply for demodulation. This carrier supply system provides means for producing a control signal related to the error angle and arranged to adjust the frequency of a local oscillator in such a way that the output thereof is accurately in phase with the component of the incoming signal which it is desired to recover by demodulation. Briefly this is accomplished by squaring a sample of the incoming signal, squaring a sample of the local oscillator output, and applying the low frequency components of their product to the frequency determinative circuit of the local oscillator to control the frequency thereof. Depending upon the application of such a resupply circuit, a phase shift may be introduced so that the local carrier may be held in phase with a particular component of the transmitted wave. In a vestigial sideband system, for example, a 90-degree phase shift is introduced in one of the quantities prior to the product taking so that the real or in-phase part of the signal may be recovered. As will appear hereinafter these operations produce a control quantity which is suitable for use in maintaining the phase of the output wave of the local oscillator in a desired relationship to that of the desired part of the received wave. In vestigial sideband systems this relationship is maintained to a high degree of accuracy so long as the effect of the quadrature coefficient (the quantity by which the quadrature carrier is modulated) upon the phase of the local oscillator output is zero. While this requirement places a limit on the performance attainable, the reduction in distortion is more than adequate for many applications and surpasses anything previously known.

It is the object of the present invention to increase further the fidelity of reproduction obtainable in the demodulation of transmitted waves by means of locally supplied carriers.

In accordance with the invention the carrier resupply system disclosed in the copending application referred to above is modified in such a way that the effect of quadrature or other unwanted components upon the local oscillator is substantially or completely eliminated. To this end the carrier resupply circuit includes in addition to a local oscillator the tuned circuit of which comprises a variable reactance, shaping networks for obtaining from a sample of the incoming signal a quantity which depends only upon the portion of that signal which it is desired to recover. The product of the squares of this quantity and of a sample of the carrier frequency output of the local oscillator is obtained and the low frequency components of the resulting quantity are applied suitably to vary the frequency of the local oscillator as required to maintain the desired phase relationship.

Figure 2:
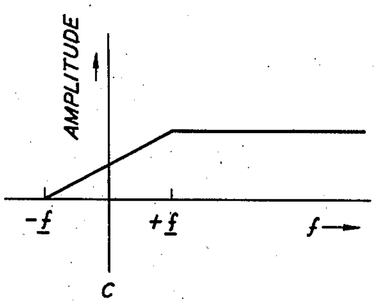
Figure 3:
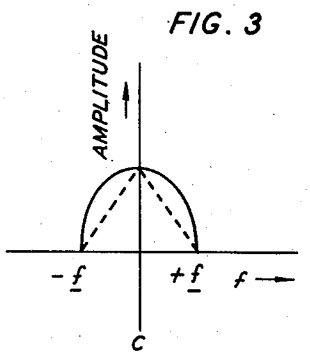

The above and other features of the invention will be described in detail in the following specification taken in connection with the drawing in which:

Fig. 1 is a block diagram of a receiver for vestigial sideband signals according to the invention; and Figs. 2 and 3 are graphs illustrating certain characteristics of the system of Fig. 1.

In the circuit of Fig. 1 an incoming vestigial sideband signal is applied to an input amplifier 10. This signal, which will be understood to have been transmitted over a suitable facility which may comprise either a radio channel or a wire or cable line, has undergone shaping of the type required to produce vestigial sideband transmission. A typical shaping characteristic employed for this purpose is that illustrated in the graph of Fig. 2. This particular characteristic which is somewhat idealized for ease of explanation provides transmission in one sideband which is uniform for all frequencies removed from the carrier by an amount greater than $f$ and zero transmission in the other sideband for all frequencies removed from the carrier by a like amount. In the frequency region extending from $-f$ to $+f$ the transmission of the network employed increases linearly. This shaping characteristic is essentially that employed in the transmission of television picture signals and may be introduced by well-known means. A typical vestigial sideband filter having this characteristic is disclosed for example in Fig. 163 at page 289 of "Principles of Television Engineering," by Fink, McGraw-Hill 1940 while the equivalent coaxial network is disclosed in Fig. 266 at page 432 of the same reference. The design of such filters is well understood and is treated in such basic reference works as "Network Analysis and Feedback Amplifier Design" by Bode, D. Van Nostrand 1945.

As a result of shaping of the type shown in Fig. 2 at the transmitter the modulated wave appearing at the input of amplifier 10 at the receiver is of the following form:

$$V=P\cos\omega t+Q\sin\omega t \qquad (1)$$

where P is the so-called in-phase coefficient, Q is the so-called quadrature coefficient and $\omega$ is $2\pi$ times the carrier frequency. It will be noted that this signal comprises two terms, the first being the in-phase or real term and the second being the quadrature term. As in the system of the copending application it is desired to supply for demodulation of this signal a locally generated carrier which is accurately in phase with the carrier of the real or in-phase component of the transmitted wave. If the transmitted wave appearing at the output of amplifier 10 is applied to a product modulator 12 together with a locally generated carrier produced by an oscillator 14, the modulation products appearing at the output of modulator 12 will include the originally applied intelligence wave which may be abstracted therefrom by a low-pass filter 16. While product modulator 12 may be of any desired type, the ring modulators described by R. S. Caruthers in The Bell System Technical Journal for April 1939 at page 317 and including a varistor bridge may advantageously be employed.

Although local oscillator 14 normally is of the same type as that employed for the generation of the carrier wave at the transmitter and may be assumed to possess the same degree of frequency stability, phase differences between the outputs of the two oscillators will occur from time to time. Any error angle in phase between these two quantities results in the production at the output of the modulator 12 of signal components due to the quadrature component of the signal wave and such components represent distortion of the intelligence wave which it is desired to recover. According to the copending application referred to above therefore, a suitable control signal derived from the received signal and the output of the local oscillator is employed to control the reactance of a variable reactor 18 which forms a part of the tuned circuit of oscillator 14.

If the carrier generated by local oscillator 14 is expressed as follows:

$$C=\cos(\omega t+\varphi) \qquad (2)$$

where $\varphi$ is the difference in phase between the output of the local oscillator and the steady state carrier of the real part of the transmitted signal and is equal to the error angle, the desired control quantity must vary from zero when the error angle is zero to such a value and in such a way as to reduce the error angle. These conditions are met by a signal which varies as $\sin 2\varphi$. Such a control signal is obtained in accordance with the copending application by multiplying the squares of V and C, with one or the other squares shifted in phase by 90 degrees, and applying the product as a control signal to vary the reactance of variable reactor 18. It may be shown that the quantity $$V^2\times C^2\angle 90^\circ=\frac{Q^2-P^2}{2}\sin 2\varphi-PQ\cos 2\varphi \qquad (3)$$

The square of V is employed rather than the first power to eliminate polarity variations in control signals caused by modulation by the message wave and appearing in the coefficient P. When P is squared this polarity ambiguity cannot occur. If the average value of Q is zero this provides a control signal of the form $$\frac{\overline{Q^2-P^2}}{2}\sin 2\varphi \qquad (4)$$

where $\overline{Q^2-P^2}$ is the average value of that quantity.

In accordance with the present invention additional means are provided which insure that the desired control signal may be obtained without regard to the type of variation occurring in the quadrature coefficient Q of the transmitted wave. Briefly, this is accomplished by acting upon the sample of the incoming wave V employed in producing the control signal to remove therefrom all but the real component thereof. In one embodiment of the invention this is accomplished by transmitting the sample of the incoming signal to be used for carrier resupply purposes through a symmetrizing network which introduces shaping in addition to that already present (which may have been introduced partly at the transmitter and partly at the receiver) such that the total shaping is symmetrical about the carrier frequency. This operation ideally reduces the quadrature coefficient to zero and modifies the in-phase coefficient. Such modification of the in-phase coefficient is unimportant because of the nature of the control quantity employed.

The arrangement of a control circuit according to the invention may now be considered with reference to Fig. 1.

As shown in Fig. 1 the output C of local oscillator 14 is applied directly to a product modulator 20 and through a 90-degree phase shifter 22 to a second product modulator 24. Each of these modulators may be of the ring type varistor bridge arrangement referred to above in connection with modulator 12.

Also applied to product modulators 20 and 24 is a sample of the incoming message signal V. This sample is applied to the modulators through a symmetrizing network 26 which modifies that portion of the received signal applied thereto in such a way as substantially or completely to eliminate therefrom the undesirable quadrature component. As has been pointed out above symmetrizer 26 provides such additional shaping as to render the total shaping characteristic, operative upon the portion of the signal applied thereto, symmetrical about the carrier frequency. The total shaping thus will be understood to include that of the type shown in Fig. 2 and introduced in the main transmission path and such additional shaping provided by symmetrizer 26 as required to produce the desired symmetrical characteristic. Two typical characteristics representing the total shaping to which the sample of the incoming signal is subjected are shown in Fig. 3 which is not necessarily drawn to the same amplitude scale as Fig. 2. Ideally the dashed-line characteristic might be employed. In practice, however, the solid line characteristic is more easily realizable and may be obtained for example through the use of a suitably designed low-pass filter having a cut-off frequency adjusted to fall at the frequency $+f$ removed from the carrier as indicated in Fig. 2 and chosen to cooperate with prior shaping circuits to provide the desired total characteristic. Assuming for example that the vestigial sideband shaping is introduced at the transmitter by means of a network such as that referred to above, the symmetrizer need constitute only a low pass filter having a cutoff frequency such as to transmit those frequencies from $-f$ to the carrier without attenuation and to attenuate according to the characteristic of Fig. 3, the frequencies between the carrier frequency and $+f$. This low pass filter may be of conventional design and may include as many sections as required to obtain a slope approximating that introduced at the other side of the carrier frequency by the vestigial sideband filter.

The effect of the symmetrical shaping to which the incoming signal sample V is subjected is to produce a new quantity V′ which may be expressed as follows:

$$V'=P'\cos\omega t+Q'\sin\omega t \qquad (5)$$

where P′ is the modified in-phase coefficient and Q′ is the new quadrature coefficient which ideally becomes zero and in any event is greatly reduced with respect to the value of Q.

This modified signal V′ is multiplied in one case by C and in the other case by $C\angle 90°$ in product modulators 20 and 24 respectively and the product outputs thereof are applied through low-pass filters 28 and 30, designed to eliminate twice the carrier frequency $\omega t$ and the corresponding sidebands, to the inputs of a third product modulator 32 which may be of the same type as modulator 12 referred to above. The output of this product modulator is proportional to $V'^2C^2\angle 90°$ and as set forth above varies only with the quantity $P'^2 \sin 2\varphi$, Q′ having been made equal to zero by the symmetrization process described above. The manner in which the quadrature component of the transmitted signal varies becomes of no importance and freedom from quadrature distortion can be obtained without regard to its value.

Rapid variations in $P'^2$ are eliminated by a lowpass filter 34 and the resultant quantity, varying in accordance with viriations in the error angle, is applied to control the value of variable reactance 18. It will be recognized therefore that as the error angle increases a corresponding change in the proper sense is produced in the reactance afforded by variable reactance 18 to increase or decrease the frequency of local oscillator 14 as the case may be to restore the desired phase relationship between the locally generated carrier and that of the transmitted signal.

What is claimed is:

1. In a demodulator for vestigial sideband signals, a local oscillator having a variable element determinative of its operating frequency, a product modulator arranged to accept the output of said local oscillator and a received vestigial sideband signal to produce a domodulated output wave and means for adjusting said local oscillator to produce an output which is accurately in phase with the real part of said received signal, comprising means for shaping a portion of said received signal to eliminate therefrom all but the components thereof lying in a symmetrical region centered on the carrier frequency, means for producing from the output of said oscillator and the output of said shaping means separate quantities respectively proportional to the squares of said outputs, one of said quantities being shifted in phase by an angle of 90 degrees, means for obtaining the product of said quantities and means for applying at least certain components of said product to said variable element to control the frequency of said oscillator.

2. In a demodulator for vestigial sideband signals comprising in-phase and quadrature components specified respectively by in-phase and quadrature coefficients, a local oscillator having a variable element determinative of its operating frequency, a product modulator arranged to accept the output of said local oscillator and the received vestigial sideband signal and means for adjusting said local oscillator to produce a carrier output which is accurately in phase with said in-phase component, comprising a branch circuit, means for applying a sample of the received signal thereto, shaping networks in said branch circuit for modifying the in-phase and quadrature coefficients of said sample to minimize the latter coefficient, means for squaring the output of said branch circuit and that of said local oscillator, means for shifting the phase of one of the squared quantities by 90 degrees and for producing a control quantity proportional to the product thereof, and means for applying said quantity to said variable element.

3. In a demodulator for vestigial sideband signals, a local oscillator having a variable element determinative of its operating frequency, a product modulator arranged to accept the output of said local oscillator and a received vestigial sideband signal to produce a demodulated output wave, and means for adjusting said local oscillator to produce a carrier output which is accurately in phase with the carrier of said received signal comprising means for shaping a portion of said received signal to eliminate therefrom all but the components lying in a symmetrical region adjacent the carrier frequency, first means for effectively squaring the output of said shaping means, second means for squaring the output of said local oscillator and shifting its phase by 90 degrees, means for obtaining a quantity equal to the product of the outputs of said first and second squaring means and means for applying the low frequency components of said quantity as a control signal to said variable element.

4. In a demodulator for vestigial sideband signals shaped according to a characteristic which provides unmodified transmission in one sideband except in a frequency region adjacent the carrier and linearly decreasing transmission in that area decreasing to zero in the other sideband, a local oscillator having a variable element determinative of its operating frequency, a product modulator arranged to accept the output of said local oscillator and a received vestigial sideband signal and to produce a demodulated output wave and means for adjusting said local oscillator to produce a carrier output which is accurately in phase with the carrier of said received signal comprising means for sampling said received signal, a low-pass filter acting upon said sample and having a transmission characteristic with a cut-off corresponding to the frequency in said one sideband in which said decrease in transmission is initiated, means responsive to the output of said low-pass filter and to that of said oscillator for producing therefrom a quantity proportional to the square of the product thereof shifted in phase by an angle of 90 degrees and means for applying said quantity as a control signal to said variable element.

5. In a demodulator for vestigial sideband signals, a local oscillator having a variable element determinative of its operating frequency, a product modulator arranged to accept the output of said local oscillator and a received vestigial sideband signal to produce a demodulated output wave and means for adjusting said local oscillator to produce an output which is accurately in phase with the real part of said received signal comprising a pair of auxiliary product modulators, means for applying the output of said local oscillator to one of said auxiliary modulators, means for shifting the phase of said output by 90 degrees and applying it to the other of said auxiliary modulators, means for applying to both of said auxiliary modulators only the part of the received vestigial sideband signal corresponding to those components which it is desired to demodulate, means for multiplying together the outputs of said auxiliary modulators to obtain a control signal and means for applying said control signal to said variable element.

References Cited in the file of this patent

UNITED STATES PATENTS

| | | |
|---|---|---|
| 2,041,855 | Ohl | May 26, 1936 |
| 2,373,569 | Kannenberg | Apr. 10, 1945 |
| 2,453,988 | Guanella | Nov. 16, 1948 |
| 2,595,608 | Robinson | May 6, 1952 |